United States Patent Office.

CHARLES S. LOCKWOOD, OF ALBANY, NEW YORK, ASSIGNOR TO THE BONSILATE COMPANY, (LIMITED,) OF SAME PLACE.

PLASTIC MATERIAL.

SPECIFICATION forming part of Letters Patent No. 283,797, dated August 28, 1883.

Application filed January 29, 1883. (No specimens.)

*To all whom it may concern:*

Be it known that I, CHARLES S. LOCKWOOD, a citizen of the United States, residing at Albany, in the county of Albany and State of New York, have invented certain new and useful Improvements in Plastic Material; and I do hereby declare the following to be a full, clear, and exact description of the invention, such as will enable others skilled in the art to which it appertains to make and use the same.

The invention has relation to improvements in plastic material. It is based upon the discovery that tannate of iron, when subjected to heat and pressure, becomes plastic, and that when bone or horn dust is combined with it a material of a very desirable character is produced.

In practicing my invention I may employ either of two formulas, one of which is as follows: In this formula I take, say, sixteen (16) parts of bone ground to an impalpable powder and thoroughly mix the same with four (4) parts of solid extract of logwood made into a solution, and then add one (1) part of sulphate of iron made into a solution. From the compound thus formed I expel all the moisture by evaporation at, say, about 120° Fahrenheit, after which the material is ready to be submitted to the dies for giving form to the same. The degrees of heat and pressure to which the dies are subjected in molding the material will vary of course according to circumstances; but I have found that when a pressure of about, say, two thousand (2,000) pounds to the square inch is continued from five (5) to ten (10) minutes, under a heat equal to about seventy (70) pounds of steam, a very satisfactory result is secured. The second formula, the employment of which produces a result the same in all essential respects as that given above, is as follows: I take, say, two (2) parts of tannate of iron and combine the same with, say, eight (8) parts of bone-dust, following the steps of the formula first above given. The resultant product of either formula is a solid black material susceptible of a high polish and practically water-proof. The chemical combination of the ingredients of either formula make tannate of iron and gelatine. In the first formula the tannic acid present in the logwood combines with the gelatine of the bone and the iron in their proper proportions.

In lieu of bone-dust, the dust of horn, ivory, and other like materials may be used, although my experience is that bone-dust is to be preferred, and I recommend its use.

It is obvious that pigments or other substances of an appropriate nature, in quantities which will not prejudicially affect the result, may be added to those above mentioned without departing from the invention.

It is also obvious that the proportions and degrees above given may be varied to some extent, according to the particular result sought to be attained, and other circumstances.

What I claim as my invention, and desire to secure by Letters Patent, is—

1. A plastic material formed by the combination of tannic acid with the gelatine of bone and iron, substantially as set forth.

2. A material composed of tannate of iron and bone or horn dust, substantially as set forth.

3. An article consisting, essentially, of tannate of iron and bone or horn dust, and formed under pressure in a heated die or mold, substantially as set forth.

In testimony whereof I affix my signature in presence of two witnesses.

CHAS. S. LOCKWOOD.

Witnesses:
CHAS. C. GILL,
HERMAN GUSTOW.